US011656615B2

(12) United States Patent
Zhou et al.

(10) Patent No.: US 11,656,615 B2
(45) Date of Patent: May 23, 2023

(54) METHODS FOR DETECTING FAN ANOMALIES WITH BUILT-IN USAGE AND SENSORY DATA

(71) Applicant: Haier US Appliance Solutions, Inc., Wilmington, DE (US)

(72) Inventors: Wei Zhou, Louisville, KY (US); Robert John Zanelli, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 126 days.

(21) Appl. No.: 17/106,991

(22) Filed: Nov. 30, 2020

(65) Prior Publication Data

US 2022/0171379 A1 Jun. 2, 2022

(51) Int. Cl.
G05B 23/02 (2006.01)
G06F 16/22 (2019.01)
G06N 20/00 (2019.01)
G05B 19/4155 (2006.01)

(52) U.S. Cl.
CPC ..... G05B 23/0283 (2013.01); G05B 19/4155 (2013.01); G06F 16/2228 (2019.01); G06N 20/00 (2019.01); *G05B 2219/50333* (2013.01)

(58) Field of Classification Search
CPC ............ G05B 23/0283; G05B 19/4155; G05B 2219/50333; G06F 16/2228; G06N 20/00; H05B 6/6473; H05B 6/642

See application file for complete search history.

(56) References Cited

U.S. PATENT DOCUMENTS

| 9,746,225 | B2 | 8/2017 | Eom et al. |
| 9,829,230 | B2 | 11/2017 | Tamaaki et al. |
| 10,012,971 | B2 | 7/2018 | Pietsch et al. |
| 10,015,021 | B2 | 7/2018 | Shin et al. |
| 2011/0004419 | A1 | 1/2011 | Ue et al. |
| 2011/0054845 | A1* | 3/2011 | Han ............... H04L 12/2825 702/185 |
| 2016/0246269 | A1* | 8/2016 | Ahmed ............... G05B 15/02 |
| 2017/0091672 | A1 | 3/2017 | Sasaki |
| 2017/0268924 | A1 | 9/2017 | Shin et al. |
| 2017/0293293 | A1 | 10/2017 | Brownie et al. |
| 2017/0336091 | A1 | 11/2017 | Arensmeier et al. |
| 2018/0135224 | A1 | 5/2018 | Yang et al. |
| 2019/0196430 | A1 | 6/2019 | Seo et al. |

FOREIGN PATENT DOCUMENTS

EP 3240267 A1 11/2017
JP 2007/305145 A 11/2007

* cited by examiner

Primary Examiner — Charles R Kasenge
(74) Attorney, Agent, or Firm — Dority & Manning, P.A.

(57) ABSTRACT

A method of detecting anomalies of a fan within an appliance includes receiving, at a service computer and/or remote server, data indicative of usage of the fan, analyzing the data indicative of usage of the fan with a machine learning model on the service computer and/or remote server, and flagging the fan for replacement when the machine learning model detects an anomaly in the data indicative of usage of the fan.

20 Claims, 4 Drawing Sheets

| Timestamp | Fan Max. V. | Fan Min. V. | Fan Avg. V. | Min. Temp. |
|---|---|---|---|---|
| 10 | 1500 | 800 | 950 | 3200 |
| 9 | 1900 | 400 | 1050 | 3500 |
| 8 | 2100 | 400 | 900 | 3800 |
| 7 | 1700 | 600 | 880 | 2900 |
| 6 | 1300 | 450 | 850 | 3700 |
| 5 | 1400 | 600 | 1150 | 3800 |
| 4 | 2100 | 800 | 1900 | 3800 |
| 3 | 1500 | 400 | 800 | 3100 |
| 2 | 1400 | 450 | 1000 | 3500 |
| 1 | 1400 | 450 | 1200 | 2900 |

FIG. 4

METHODS FOR DETECTING FAN ANOMALIES WITH BUILT-IN USAGE AND SENSORY DATA

FIELD OF THE INVENTION

The present subject matter relates generally to methods for detecting fan anomalies with built-in usage and sensory data.

BACKGROUND OF THE INVENTION

Appliances frequently include a fan for forced air flow. For instance, certain oven appliances include a cooling fan to flow air through a cabinet and thereby maintain an exterior temperature of the cabinet below a threshold temperature. When such cooling fans fail, the oven appliances are deactivated and inoperable in order to avoid elevated exterior cabinet temperatures. Right up to failure, fans may function to flow air; however, the fans may operate at reduced capacity or with other anomalies prior to failure.

Accordingly, systems and methods for detecting fan anomalies prior to fan failure would be useful.

BRIEF DESCRIPTION OF THE INVENTION

Aspects and advantages of the invention will be set forth in part in the following description, or may be apparent from the description, or may be learned through practice of the invention.

In accordance with one example embodiment, a method of detecting anomalies of a fan within an appliance includes connecting a service computer to the appliance such that data from the appliance is transmittable to the service computer, receiving, at the service computer, data indicative of usage of the fan, analyzing the data indicative of usage of the fan with a machine learning model on the service computer, and flagging the fan for replacement when the machine learning model on the service computer detects an anomaly in the data indicative of usage of the fan.

In accordance with another example embodiment, a method of detecting anomalies of a fan within an appliance, the method includes connecting the appliance to a remote server over a network such that data from the appliance is transmittable to the remote server, receiving, at the remote server, data indicative of usage of the fan, analyzing the data indicative of usage of the fan with a machine learning model on the remote server, and flagging the fan for replacement when the machine learning model on the remote server detects an anomaly in the data indicative of usage of the fan.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 4 is a rolling table of data indicative of fan usage according to an example embodiment of the present subject matter.

Figure 1:
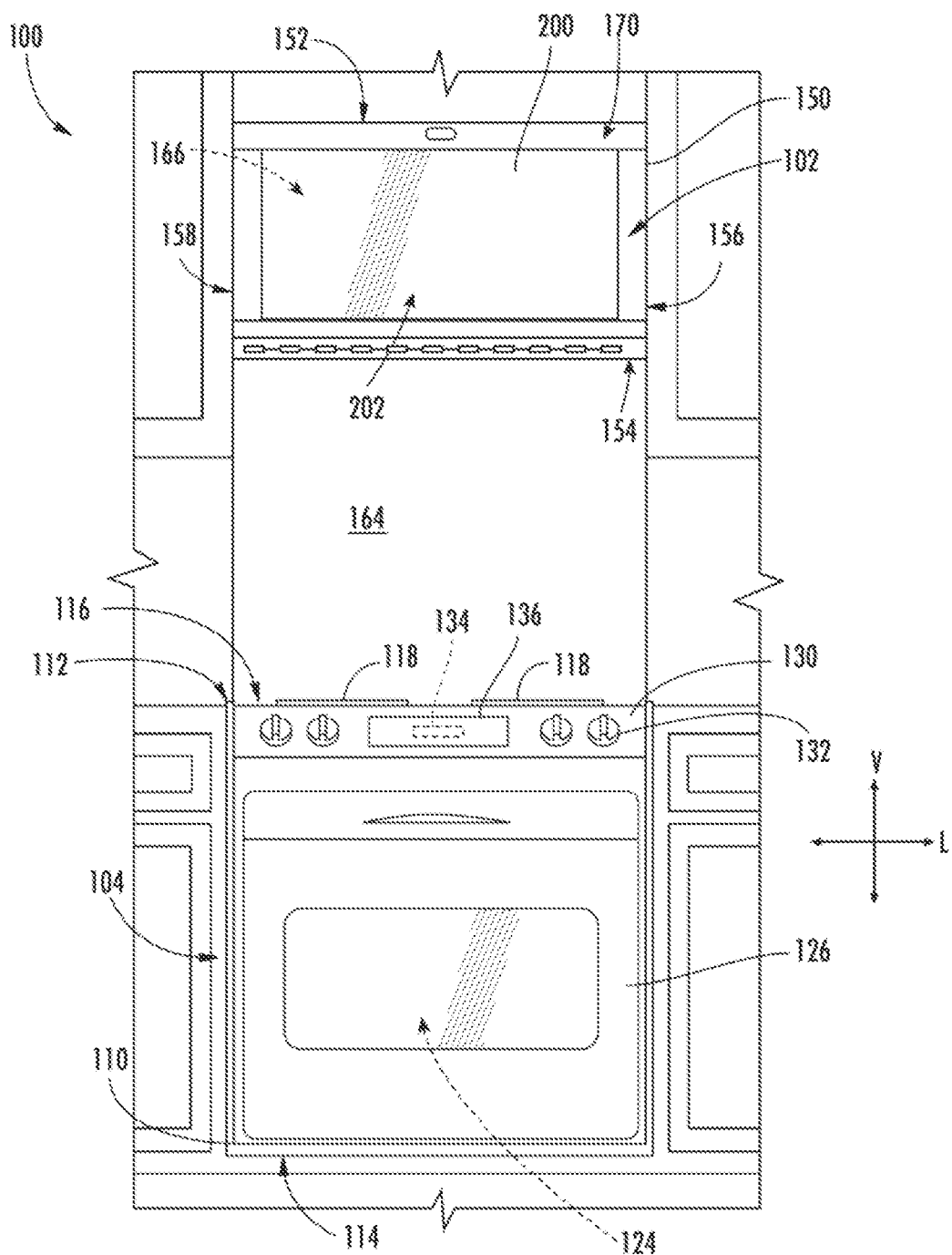
FIG. 1 is a front elevation view of an example microwave appliance positioned above an example cooktop appliance, according to example embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Turning to the figures, FIG. 1 is a front elevation view of a system 100 with an over-the-range (OTR) microwave appliance 102 and a cooktop appliance 104. Microwave appliance 102 can be positioned or mounted above cooktop appliance 104. It should be appreciated that the present subject matter is not limited to microwave appliances or cooktop appliances, and the specific appliance configurations are not intended to limit the scope of the present subject matter in any manner. For instance, the present subject matter may be used in any appliance with a fan, such as an oven appliance, a dishwasher appliance, a dryer appliance, a heat pump water heater appliance, a refrigerator appliance, etc. As shown in FIG. 1, a vertical direction V and a lateral direction L are perpendicular.

Cooktop appliance 104 can include a chassis or cabinet 110 that extends: along the vertical direction V between a top portion 112 and a bottom portion 114; along the lateral direction L between a left side portion and a right side portion; and along a traverse direction (that is perpendicular to the vertical and transverse directions V, T) between a front portion and a rear portion. Cooktop appliance 104 includes a cooktop surface 116 having one or more heating elements 118 for use in, for example, heating or cooking operations. In exemplary embodiments, cooktop surface 116 is constructed with ceramic glass. In other embodiments, however, cooktop surface 116 may include of another suitable material, such as a metallic material (e.g., steel) or another suitable non-metallic material. Heating elements 118 may be various sizes and may employ any suitable method for heating or cooking an object, such as a cooking utensil, and its contents. In some embodiments, for example, heating element 118 uses a heat transfer method, such as electric coils or gas burners, to heat the cooking utensil. In other embodiments, however, heating element 118 uses an induction heating method to heat the cooking utensil directly. In turn, heating element 118 may include a gas burner element, resistive heat element, radiant heat element, induction element, or another suitable heating element.

In some embodiments, cooktop appliance 104 includes an insulated cabinet 110 that defines a cooking chamber 124 selectively covered by a door 126. One or more heating elements (e.g., top broiling elements 128 or bottom baking elements 129, shown in FIG. 2) may be enclosed within cabinet 110 to heat cooking chamber 124. Heating elements 128, 129 within cooking chamber 124 may be provided as any suitable element for cooking the contents of cooking chamber 124, such as an electric resistive heating element, a gas burner, a microwave element, a halogen element, etc. Thus, cooktop appliance 104 may be referred to as an oven range appliance. As will be understood by those skilled in the art, cooktop appliance 104 is provided by way of example only and the present subject matter may be used in the context of any suitable cooking appliance, such as a double oven range appliance or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface panel 130 may be provided on cooktop appliance 104. Although shown at front portion of cooktop appliance 104, another suitable location or structure (e.g., a backsplash) for supporting user interface panel 130 may be provided in alternative embodiments. In some embodiments, user interface panel 130 includes input components or controls 132, such as one or more of a variety of electrical, mechanical, or electro-mechanical input devices. Controls 132 may include, for example, rotary dials, knobs, push buttons, and touch pads. A controller 134 is in communication with user interface panel 130 and controls 132 through which a user may select various operational features and modes and monitor progress of cooktop appliance 104. In additional or alternative embodiments, user interface panel 130 includes a display component 136, such as a digital or analog display in communication with a controller 134 and configured to provide operational feedback to a user. In certain embodiments, user interface panel 130 represents a general purpose I/O ("GPIO") device or functional block.

As shown, controller 134 is communicatively coupled (i.e., in operative communication) with user interface panel 130, controls 132, and display 136. Controller 134 may also be communicatively coupled with various operational components of cooktop appliance 104 as well, such as heating elements (e.g., 118, 128), sensors, etc. Input/output ("I/O") signals may be routed between controller 134 and the various operational components of cooktop appliance 104. Thus, controller 134 can selectively activate and operate these various components. Various components of cooktop appliance 104 are communicatively coupled with controller 134 via one or more communication lines such as, for example, conductive signal lines, shared communication busses, or wireless communications bands.

In some embodiments, controller 134 includes one or more memory devices and one or more processors. The processors can be any combination of general or special purpose processors, CPUs, or the like that can execute programming instructions or control code associated with operation of cooktop appliance 104. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 134 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 134 includes a network interface such that controller 134 can connect to and communicate over one or more networks with one or more network nodes. Controller 134 can also include one or more transmitting, receiving, or transceiving components for transmitting/receiving communications with other devices communicatively coupled with cooktop appliance 104, such as microwave appliance 102, a service computer 140 via connection 142, and/or a remote server 144 via a network 146. Additionally, or alternatively, one or more transmitting, receiving, or transceiving components can be located off board controller 134. Generally, controller 134 can be positioned in any suitable location throughout cooktop appliance 104. For example, controller 134 may be located proximate user interface panel 130 toward front portion of cooktop appliance 104.

Cooktop appliance 104 may also include one or more fans 120 operable to flow air. For instance, fan 120 shown in FIG. 2 may be a convection fan operable to flow heated air within cooking chamber 124 in order to increase convective heating of articles in cooking chamber 124. As another example, fan 120 may be a cooling fan operable to flow air through cabinet 110 in order to assist with cooling an outer surface of cabinet 110 and maintain the surface below a safe-to-touch threshold temperature. Controller 134 may be in operative communication with fan 120, and controller 134 may regulate operation of fan 120. Thus, e.g., controller 134 may selectively activate fan 120, control a speed of fan 120, etc.

Cooktop appliance 104 may include features for collecting data indicative of usage of fan 120. For example, fan 120 and/or controller 134 may include a memory that stores data indicative of usage of fan 120. Moreover, fan 120 and/or controller 134 may include a rolling table within the memory of fan 120 and/or controller 134, and the rolling table may be populated with the data indicative of usage of fan 120. For instance, each time that fan 120 operates to flow air, the fan 120 and/or controller 134 may populate the rolling table with new data indicative of usage of fan 120 and/or remove the oldest data indicative of usage of fan 120.

An example rolling table 400 for data indicative of usage of fan 120 is shown in FIG. 4. Rolling table 400 may be in memory of fan 120, controller 134, and/or another memory. As may be seen in FIG. 4, rolling table 400 of data indicative of usage of fan 120 may include a plurality of timestamped data indicative of usage of fan 120. Moreover, fan 120 and/or controller 134 may populate each row of rolling table 400 with data indicative of usage of fan 120. The newest data is indicated with timestamp "10" in rolling table 400, and the oldest data is indicated with timestamp "1" in rolling table 400. A new entry may be added to rolling table 400 each operation cycle of fan 120. For instance, each time that fan 120 operates to flow air, rolling table 400 may be populated with new data indicative of usage of fan 120 with timestamp "1", the remaining data indicative of usage of fan 120 within rolling table 400 may shift down one (1) integer within rolling table, and the oldest data with timestamp "10" in rolling table 400 may be removed from rolling table when the data from timestamp "9" moves downwardly in rolling table 400. Thus, e.g., data within rolling table 400 may be in a last-in-first-out (LIFO) format. It will be understood that rolling table 400 is provided by way of example only and that other suitable data organization formats may be used in alternative example embodiments. For instance, the order of cycle records in memory may not be sequential and/or the time index may increase over time, i.e., the counter may increase incrementally, in certain example embodiments.

The data indicative of usage of fan 120 may include various data types. For instance, as shown in FIG. 4, the data indicative of usage of fan 120 may include a maximum velocity of fan 120, a minimum velocity of fan 120, an average velocity of fan 120, and a temperature at fan 120 each time that fan 120 is operated, e.g., for each timestamp in rolling table 400. It will be understood that the particular types of data indicative of usage of fan 120 shown in rolling table 400 is provided by way of example only and that other suitable data may be collected in alternative example embodiments. Rolling table 400 may also include a suitable number of time entries. For instance, as shown in FIG. 4, rolling table 400 may have no less than ten timestamps such that data for fan 120 from a past ten operation cycles of fan 120 and/or the past ten times that fan 120 operates to flow air is included within rolling table 400. It will be understood that rolling table 400 may have another suitable number of time entries in alternative example embodiments, e.g., more than ten entries and/or less than five hundred entries.

It will be appreciated that data indicative of usage of fan 120 may be stored locally on cooktop appliance 104, e.g., within a memory, such as a ROM memory, in cooktop appliance 104. The local memory in cooktop appliance 104 may be rolling and limited in size, e.g., to no less than ten (10) entries and no more than one hundred and forty (140) entries. As an alternative or in addition to local data storage, cooktop appliance 104 may also be in communication with a remote server 144 via a network 146, as discussed in greater detail below. Data indicative of usage of fan 120 may be streamed to the cloud, remote server 144, and the cloud may maintain all data indicative of usage of fan 120. Moreover, data indicative of usage of fan 120 stored in the cloud may not be rolling such that data indicative of usage of fan 120 increases with each operation cycle of cooktop appliance 104.

As noted above, microwave appliance 102 may be positioned or mounted above cooktop appliance 104 (e.g., as an OTR microwave). Specifically, a cabinet 150 of microwave appliance 102 may be positioned above cooktop appliance 104 along the vertical direction V. Cabinet 150 of microwave appliance 102 includes a plurality of outer walls and when assembled, microwave appliance 102 generally extends: along the vertical direction V between a top end 152 and a bottom end 154; along the lateral direction L between a first side end 156 and a second side end 158 (FIG. 1); and along the transverse direction between a front end and a rear end. In some embodiments, cabinet 150 is spaced apart from cooktop surface 116 along the vertical direction V. An open region 164 may thus be defined along the vertical direction V between cooktop surface 116 and bottom end 154 of cabinet 150. Although a generally rectangular shape is illustrated, any suitable shape or style may be adapted to form the structure of cabinet 150. Within cabinet 150, an internal liner of cabinet 150 defines a cooking chamber 166 for receipt of food items for cooking.

Microwave appliance 102 includes a door assembly 170 that is movably mounted (e.g., rotatably attached) to cabinet 150 in order to permit selective access to cooking chamber 166. Specifically, door assembly 170 can move between an open position (not pictured) and a closed position (e.g., FIG. 1). The open position permits access to cooking chamber 166 while the closed position restricts access to cooking chamber 166. Except as otherwise indicated, with respect to the directions (e.g., the vertical direction V, the lateral direction L, and the transverse direction), the door assembly 170 is described in the closed position. A handle may be mounted to or formed on door assembly 170 to assist a user with opening and closing door assembly 170. As an example, a user can use the handle to open or close door assembly 170 and access or cover cooking chamber 166. Additionally, or alternatively, microwave appliance 102 may include a door release button (not pictured) that disengages or otherwise pushes open door assembly 170 when depressed.

Figure 2:
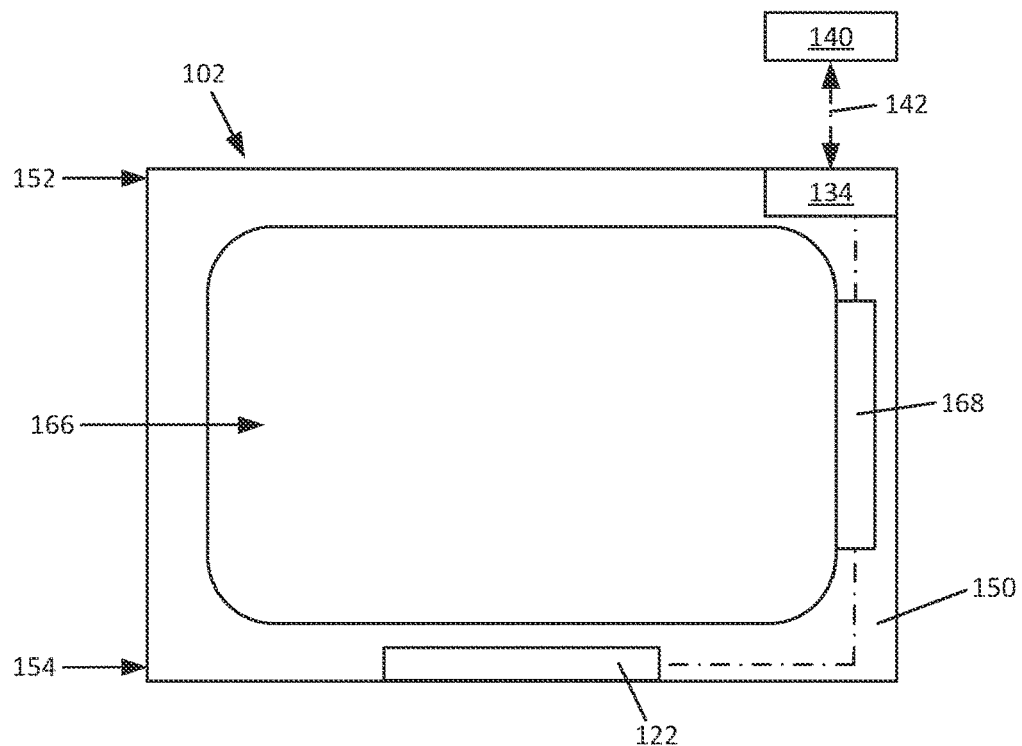
FIG. 2 is a schematic view of certain components of the example microwave and cooktop appliances of FIG. 1.
Figure 2:
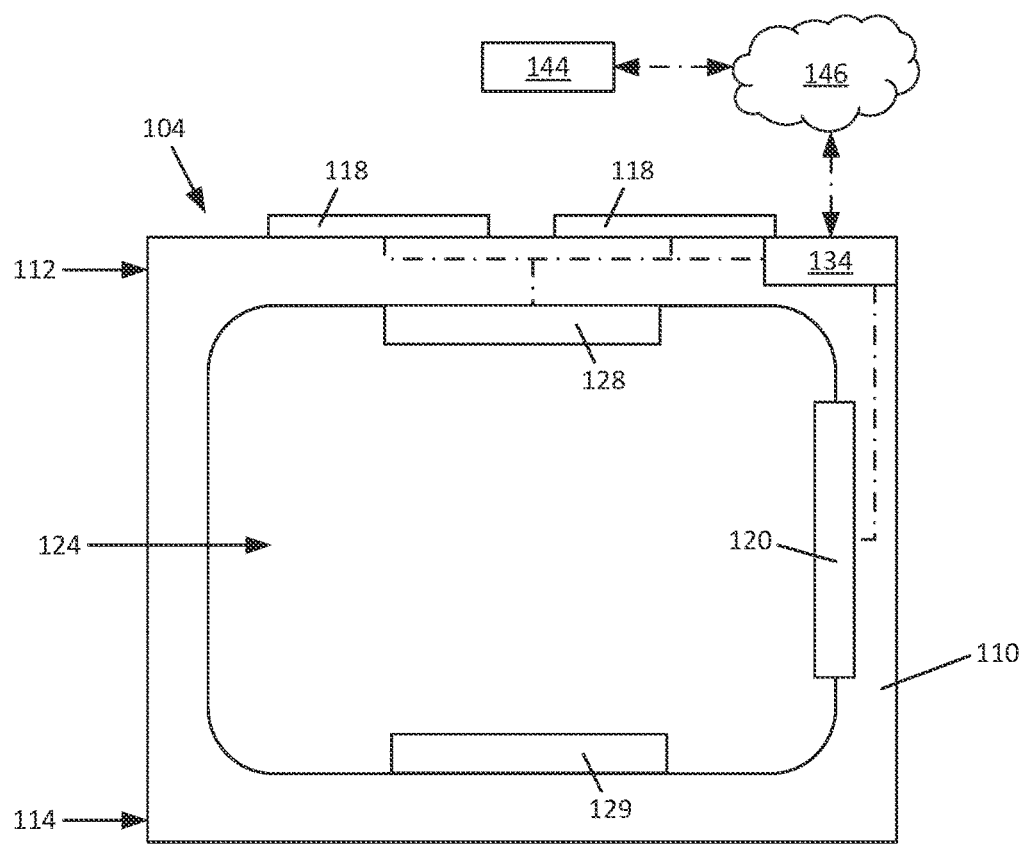

Referring to FIGS. 1 and 2, microwave appliance 102 is generally configured to heat articles (e.g., food or beverages) within cooking chamber 166 using electromagnetic radiation. Microwave appliance 102 may include various components which operate to produce the electromagnetic radiation, as is generally understood. For example, microwave appliance 102 may include a heating assembly 168 having a magnetron (e.g., a cavity magnetron), a high voltage transformer, a high voltage capacitor, and a high voltage diode, as is understood. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 166. The structure and intended function of microwave ovens or appliances are generally understood by those of ordinary skill in the art and are not described in further detail herein.

Referring still generally to FIGS. 1 and 2, microwave appliance 102 may include an interactive display assembly 200. According to the illustrated embodiment, interactive display 200 is mounted to or within a door assembly 170 and defines substantially the entire front surface of door assembly 170. In this regard, interactive display 200 extends along substantially the entire width of door assembly 170 along the lateral direction L and substantially along the entire height of door assembly 170 along the vertical direction V.

Generally, interactive display assembly 200 may be any suitable type of mechanism for visually presenting a digital (e.g., interactive) image. For example, interactive display assembly 200 may be an image monitor such as a liquid crystal display (LCD), a plasma display panel (PDP), etc. Thus, interactive display assembly 200 includes an imaging surface 202 (e.g., screen or display panel) at which the digital image is presented or displayed as an optically-viewable picture (e.g., static image or dynamic video) to a user. As illustrated, the imaging surface 202 generally faces, or is directed toward the area forward from the appliance 102 (e.g., when door assembly 170 is in the closed position).

During use, a user standing in front of microwave appliance 102 may thus see the optically-viewable picture (e.g., timer, recipe, dynamic video stream, graphical user interface, etc.) displayed at the imaging surface 202.

The optically-viewable picture at the imaging surface 202 may correspond to any suitable signal or data received or stored by microwave appliance 102 (e.g., at controller 134). As an example, image monitor 230 may present recipe information in the form of viewable text or images. As another example, interactive display assembly 200 may present a graphical user interface (GUI) 204 (e.g., as part of user interface) that allows a user to select or manipulate various operational features of microwave appliance 102 or cooktop appliance 104. During use of such GUI embodiments, a user may engage, select, or adjust the image presented at interactive display assembly 200 through any suitable input, such as gesture controls, voice controls detected through one or more microphones, associated touch panels (e.g., capacitance or resistance touch panels) or sensors overlaid across imaging surface 202, etc. According to the illustrated embodiment, interactive display assembly 200 is a tablet or touch screen display that extends an entire width and height of door assembly 170 and provides for an interactive experience to the user of microwave appliance 102.

Similar to cooktop appliance 104, microwave appliance 102 may include a controller 134 that facilitates operation of microwave appliance 102. In addition, it should be appreciated that according to exemplary embodiments, in addition to interactive display assembly 200, microwave appliance may further include an additional user interface panel (e.g., similar to user interface panel 130), user inputs (e.g., similar to user inputs 132), a controller (e.g., similar to controller 134), and/or additional displays (such as display 136). Controller 134 may be mounted within cabinet 150, may be mounted within or be a part of interactive display assembly 200, or may be positioned and integrated in any other suitable manner. In some embodiments, cooktop controller 134 is provided as or as part of microwave controller 134. In alternative embodiments, cooktop controller 134 is a discrete unit in selective operable communication with microwave controller 134 (e.g., through one or more wired or wireless channels). A detailed description of such components is omitted here for brevity.

Microwave appliance 102 may also include one or more fans 122 operable to flow air. For instance, fan 122 shown in FIG. 2 may be a vent fan operable to draw air/fumes from below microwave appliance 102. As another example, fan 122 may be a cooling fan operable to flow air through cabinet 110 in order to assist with cooling internal components of microwave appliance 102, such as heating assembly 168. Controller 134 may be in operative communication with fan 122, and controller 134 may regulate operation of fan 122. Thus, e.g., controller 134 may selectively activate fan 122, control a speed of fan 122, etc.

Like cooktop appliance 104, microwave appliance 102 may include features for collecting data indicative of usage of fan 122. For example, fan 122 and/or controller 134 may include a memory that stores data indicative of usage of fan 122. Moreover, fan 122 and/or controller 134 may include a rolling table within the memory of fan 122 and/or controller 134, and the rolling table may be populated with the data indicative of usage of fan 122. The rolling table may be the same or similar to that shown in FIG. 4 and described above for cooktop appliance 104. Thus, further description of the rolling table and the features for collecting data indicative of usage of fan 122 is omitted for the sake of brevity.

As shown in FIG. 2, microwave appliance 102 and cooktop appliance 104 may communicate with external systems, such as a service computer and/or a remote server. Specifically, according to the illustrated embodiment, microwave appliance 102, e.g., controller 134 of microwave appliance 102, may communicate directly with a service computer 140 via a local connection 142, such as a wired connection, WiFi, Bluetooth, NFC, etc. Moreover, as shown in FIG. 2, cooktop appliance 104, e.g., controller 134 of cooktop appliance 104, may communicate indirectly with a remote server 144 via a network 146. It will be understood that each of microwave appliance 102 and cooktop appliance 104 may communicate with service computer 140 and/or remote server 144 and that the description of the communication between appliances and service computer 140 and/or remote server 144 is generally applicable to both microwave appliance 102 and cooktop appliance 104.

As may be seen from the above, microwave appliance 102 and cooktop appliance 104 allow controllers 134 to communicate with external devices either directly or through a network 146. For example, a service technician may use service computer 140 to communicate directly with microwave appliance 102 or cooktop appliance 104. In particular, service computer 140 may be in direct communication with microwave appliance 102 or cooktop appliance 104 via local connection 142, such as a USB wire, Firewire, a local area network (LAN), Wi-Fi, Bluetooth, near-field communication (NFC), etc. In general, service computer 140 may be any suitable portable computing device, such as a personal phone, a tablet, a laptop computer, etc.

Remote server 144 may be in communication with microwave appliance 102 or cooktop appliance 104 through network 146. In this regard, for example, remote server 144 may be configured for sending and receiving data from microwave appliance 102 and cooktop appliance 104 via network 146. In this regard, remote server 144 may be a cloud-based server and is thus located at a distant location, such as in a separate state, country, etc. In general, communication between the remote server 144 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL). In general, network 146 can be any type of communication network. For example, network 146 can include one or more of a wireless network, a wired network, a personal area network, a local area network, a wide area network, the internet, a cellular network, etc.

It should be appreciated that the exemplary functions and configurations of the external communication systems for microwave appliance 102 and cooktop appliance 104 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

Figure 3:
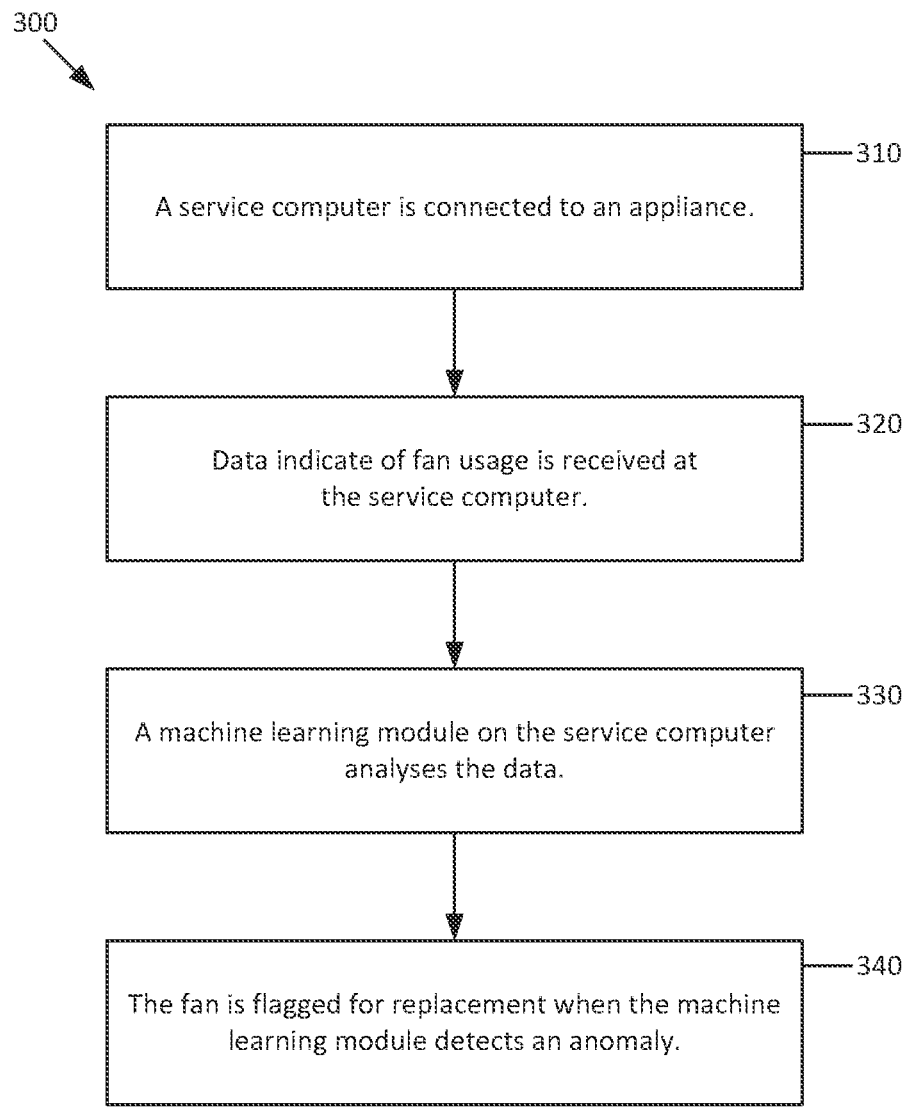
FIG. 3 is a flow chart of a method for detecting anomalies of a fan within an appliance according to an example embodiment of the present subject matter.

Now that the construction of microwave appliance 102 and cooktop appliance 104 according to example embodiments have been presented, an example method 300 of detecting anomalies of a fan within an appliance. FIG. 3 depicts an exemplary method 300 performed in a particular order for purposes of illustration and discussion. Those of ordinary skill in the art, using the disclosures provided herein, will understand that the steps of any of the method discussed herein can be adapted, rearranged, expanded, omitted, or modified in various ways without deviating from the scope of the present disclosure.

Method 300 can be used with microwave appliance 102 and/or cooktop appliances 104 to detect anomalies of fans 120, 122 or to detect anomalies in fans of any other suitable appliances. In this regard, for example, service computer 140 may be configured for implementing method 300 for any suitable appliance with a fan. However, it should be appreciated that the exemplary method 300 is discussed herein only to describe exemplary aspects of the present subject matter, and is not intended to be limiting. For instance, remote server 144 may be configured for implementing method 300 for any suitable appliance with a fan. Thus, it should be understood that while described below in the context of service computer 140, method 300 may be implemented on remote server 144, e.g., as a cloud service, in alternative example embodiments.

At 310, service computer 140 is connected to an appliance with a fan, such as microwave appliance 102. For instance, a service technician may directly connect service computer to microwave appliance 102 via a wired connection, WiFi, Bluetooth, etc. at 310. It will be understood that while described below in greater detail in the context of microwave appliance 102, method 300 may be used with other suitable appliances with fans, such as cooktop appliance 104, a heat pump water heater appliance, a dishwasher appliance, a dryer appliance, a refrigerator appliance, etc. By connecting service computer 140 to microwave appliance 102 at 310, data from microwave appliance 102 may be transmittable to service computer 140. Thus, e.g., data may be transmitted from fan 122 or controller 134 to service computer via connection 142 after 310.

At 320, data indicative of usage of fan 122 is transmitted to service computer 140. For instance, data indicative of usage of fan 122 may be transmitted to service computer 140 directly from microwave appliance 102 after connecting service computer 140 to microwave appliance 102 at 310. The data indicative of usage of fan 122 may be a rolling table of time-indexed fan usage data stored in a memory within microwave appliance 102, e.g., having the format of rolling table 400. The rolling table may include, inter alia, a maximum fan speed, a minimum fan speed, and an average fan speed for each time collection point within the rolling table. The data indicative of usage of fan 122 is collected over time, e.g., by one or more sensors within microwave appliance 102, during operation of microwave appliance 102 and fan 122, and then the data is transmitted to service computer 140 for analysis as part of method 300 at 320.

At 330, the data indicative of usage of fan 122 is analyzed with a machine learning model on service computer 140. The machine learning module on service computer 140 may detect a performance anomaly of fan 122 prior to failure or when fan 122 is operable to move air by analyzing historical data indicative of usage of fan 122 from 320. In particular, the machine learning module on service computer 140 may detect the performance anomaly of fan 122 based upon a trend in the historical data indicative of usage of fan 122 from 320 in order to detect that fan 122 is prone to failure prior to actual failure or when fan 122 is still operable to move air. For instance, the machine learning module on service computer 140 may detect a symptomatic change in the performance of fan prior to failure, such as a speed drop, a speed increase, an increase in the power required to operate fan, an abnormal increase in a variance of the speed, etc. As a specific example, the machine learning module on service computer 140 may detect that fan 122 is incapable of consistently operating at a commanded speed based on the data indicative of usage of fan 122 from 320. As another example, the machine learning module on service computer 140 may detect that fan 122 is requiring excessive input power to operate at a commanded speed based on the data indicative of usage of fan 122 from 320. To analyze the data from 320, the machine learning module on service computer 140 may be configured to implement, for example, data analysis and artificial intelligence processes, such as heuristics, support vector machines, neural networks, the Markov decision process, natural language processing, case-based reasoning, rule-based systems, genetic algorithms, fuzzy systems, multi-agent systems, or any other suitable known techniques or algorithms.

At 340, fan 122 is flagged for replacement when the machine learning model on service computer 140 detects an anomaly in the data indicative of usage of fan 122 from 320. Fan 122 may be operational to flow air and no fault code for fan 122 or microwave appliance 102 may be active when fan 122 is flagged for replacement at 340. Thus, fan 122 may be flagged for replacement prior to failure of fan 122. After 340, fan 122 may be proactively replaced based on the anomaly in the data indicative of usage of fan 122 at 330.

To supplement the data indicative of usage of fan 122 from 330, method 300 may also include receiving, at service computer 140, data indicative of a season (such as spring, summer, fall winter) at microwave appliance 102, a physical location (such as address, coordinates) of microwave appliance 102, or both for each time in the rolling table at 320. Using the season and/or physical location, ambient conditions at microwave appliance 102 can be determined. For instance, an ambient outdoor temperature and/or elevation of microwave appliance 102 may be determined. Such additional data may be used by the machine learning module on service computer 140 to better understand the data indicative of usage of fan 122 from 320. For instance, in warm, dry weather (such as during the summer) the speed of fan 122 may be predictably faster. Conversely, in cold, damp weather (such as during the spring) the speed of fan 122 may be predictably slower. As another example, at higher elevations, the speed of fan 122 may be predictably faster. In contrast, at lower elevations, the speed of fan 122 may be predictably slower. As may be seen from the above, by accumulating seasonal and/or location data for microwave appliance in addition of the data indicative of usage of fan 122, the machine learning module on service computer 140 at 330 may more accurately detect an anomaly in the data indicative of usage of fan 122 from 320. Accordingly, method 300, may include obtain seasonality, geolocation, barometric, and/or elevation data for the data indicative of usage of fan 122 from 330 in order to improve detection performance.

As may be seen from the above, the present subject matter may provide a new software application architecture that functions as a predictive fan anomaly detection method for an air-moving motor and cooling fan in appliances with built-in usage and sensory data storage capability. This software application architecture may detect a performance anomaly for these for air-moving motor and cooling fan systems before fan failure takes place. The software application architecture provides on-the-edge diagnostics with a machine learning module for quick problem detection and can be invoked locally or remotely.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of detecting anomalies of a fan within an appliance, the appliance comprising a heating assembly configured to provide heat for cooking, the method comprising:
connecting a service computer to the appliance such that data from the appliance is transmittable to the service computer;
receiving, at the service computer, data indicative of usage of the fan cooling the heating assembly during cooking;
analyzing the data indicative of usage of the fan with a machine learning model on the service computer; and
flagging the fan for replacement when the machine learning model on the service computer detects an anomaly in the data indicative of usage of the fan.

2. The method of claim 1, wherein the data indicative of usage of the fan comprises a rolling table of time-indexed fan usage data stored in a memory of the appliance.

3. The method of claim 2, wherein the rolling table of time-indexed fan usage data comprises one or more of a maximum fan speed, a minimum fan speed, and an average fan speed for each time of the time-indexed data indicative of usage of the fan.

4. The method of claim 2, wherein a new entry in the rolling table of time-indexed fan usage data is populated each operation cycle of the fan.

5. The method of claim 4, wherein the memory in the appliance is limited to no less than ten (10) data entries and no more than one hundred and forty (140) data entries, the data entries entered in a last-in-first-out (LIFO) format.

6. The method of claim 4, wherein the rolling table of time-indexed fan usage data has no less than a past ten operation cycles of the fan.

7. The method of claim 1, wherein the data indicative of usage of the fan is time-indexed, and the method further comprises receiving, at the service computer, data indicative of a season at the appliance, a physical location of the appliance, or both the season and the physical location for each time of the time-indexed data indicative of usage of the fan.

8. The method of claim 1, wherein the appliance is an oven appliance, a refrigerator appliance, a dryer appliance, a microwave appliance, or a heat pump water heater appliance.

9. The method of claim 1, further comprising replacing the fan when the machine learning model on the service computer detects the anomaly in the data indicative of usage of the fan.

10. The method of claim 1, wherein the fan is operational to flow air and no fault code for the fan is active when the fan is flagged for replacement.

11. A method of detecting anomalies of a fan within an appliance, the appliance comprising a heating assembly configured to provide heat for cooking, the method comprising:
connecting the appliance to a remote server over a network such that data from the appliance is transmittable to the remote server;
receiving, at the remote server, data indicative of usage of the fan cooling the heating assembly during cooking;
analyzing the data indicative of usage of the fan with a machine learning model on the remote server; and
flagging the fan for replacement when the machine learning model on the remote server detects an anomaly in the data indicative of usage of the fan.

12. The method of claim 11, wherein the data indicative of usage of the fan comprises a rolling table of time-indexed fan usage data stored in a memory of the appliance.

13. The method of claim 12, wherein the rolling table of time-indexed fan usage data comprises one or more of a maximum fan speed, a minimum fan speed, and an average fan speed for each time of the time-indexed data indicative of usage of the fan.

14. The method of claim 13, wherein a new entry in the rolling table of time-indexed fan usage data is populated each operation cycle of the fan.

15. The method of claim 14, wherein the rolling table of time-indexed fan usage data has no less than a past ten operation cycles of the appliance.

16. The method of claim 15, wherein the memory in the appliance is limited to no less than ten (10) data entries and no more than one hundred and forty (140) data entries, the data entries entered in a last-in-first-out (LIFO) format.

17. The method of claim 11, wherein the data indicative of usage of the fan is time-indexed, and the method further comprises receiving, at the remote server detects, data indicative of a season at the appliance, a physical location of the appliance, or both the season and the physical location for each time of the time-indexed data indicative of usage of the fan.

18. The method of claim 11, wherein the appliance is an oven appliance, a refrigerator appliance, a dryer appliance, a microwave appliance, or a heat pump water heater appliance.

19. The method of claim 11, further comprising replacing the fan when the machine learning model on the remote server detects the anomaly in the data indicative of usage of the fan.

20. The method of claim 11, wherein the fan is operational to flow air and no fault code for the fan is active when the fan is flagged for replacement.

* * * * *